United States Patent Office 3,044,990
Patented July 17, 1962

3,044,990
SEGMENTED POLYMER CONTAINING N-ALKYLATED URETHANE GROUPS
Walter Steuber, Springfield, Pa., assignor to E. I. du Pont de Nemours and Company, Wilmington, Del., a corporation of Delaware
No Drawing. Filed Nov. 18, 1958, Ser. No. 774,583
14 Claims. (Cl. 260—77.5)

This invention relates to new and valuable synthetic linear segmented polymers derived from N-alkylated polyurethanes and urea, urethane, and amide polymer-forming reactants. More particularly, it relates to segmented polymers comprising urea, urethane, or amide segments linked to N-alkylated polyurethane segments through urethane groups. This invention further relates to segmented polymers which may be shaped into filaments having high elasticity which are provided by a critical selection of the N-alkylated polyurethanes and urea, urethane, and amide polymer-forming reactants.

While numerous synthetic and natural polymers which may be shaped into articles having elastic qualities are known, such products have, in general, been deficient in at least one or more properties, such as unsuitability for spinning into elastic fibers, relatively low sticking temperatures, poor hydrolytic stability, and poor color stability to ultraviolet light.

It is, therefore, an object of this invention to provide new synthetic linear segmented polymers derived from N-alkylated polyurethanes which have a high order of solubility in organic solvents and are suitable for spinning into elastic fibers. Another object is to provide elastic fibers from the novel polymers of this invention which have improved elastic properties and are spinnable into fine denier filaments. A further object is to provide elastic filaments which have high sticking temperatures. Still another object is to provide elastic segmented polymers having a high order of hydrolytic stability and color stability to ultraviolet light. Other objects will appear hereinafter.

The objects of this invention are accomplished by providing a segmented, substantially linear polymer consisting of alternating first and second segments connected through urethane linkages, said first segment being the residue on removal of the functional end groups from a difunctional N-alkylated polyurethane having a melting point below about 60° C. and a molecular weight above about 600, said second segment being at least one repeating unit of a non-bisureylene nitrogen-containing polymer having a melting point above about 200° C. in its fiber-forming molecular weight range. The segmented polymers of this invention are, among others, disclosed in my patent U.S. 2,813,775.

This invention provides polymers containing (1) a difunctional N-alkylated polyurethane with a molecular weight above about 600 (preferably between 800 and about 5000) and a melting point below about 60° C. chemically through urethane linkages to (2) units or segments of an amide, a urethane or a urea polymer or copolymer which in the non-segmented state has a melting point above 200° C. in the fiber-forming molecular weight range. The term "amide" includes both carbonamide and sulfonamide linkages. Thus, the segmented polymer is an intralinear nitrogen-containing polymer made up of non-bisureylene high melting or "hard" segments having nitrogen atoms in the chain in the form of urea, amide, or urethane groups, which "hard" segments are chemically bonded by urethane groups to low melting or "soft" segments derived from an N-alkylated polyurethane.

The segmented polymers of this invention may be represented by the formula.

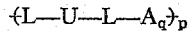

wherein U represents the soft segment, being the residue on removal of the functional end groups from a difunctional N-alkylated polyurethane, such as HO—U—OH and HNR—U—RNH, said polyurethane having a molecular weight over 600, a melting point below 60° C., and having the intralinear recurring group

—O—CO—NR— connected to carbon atoms of the polymer chain, R being an alkyl radical or an alkylene radical which together with the carbon atoms of the polymer chain may form a ring (e.g., the alkylene chain of a heterocyclic diamine); L is the linking urethane group —O—CO—NX—, where X may be either H or R, R being defined above; A is the repeating unit of a polyamide having recurring

—CO—NX— groups in the polymer chain, or of a polyurea having recurring —NX—CO—NX— groups in the polymer chain, or of a polyurethane having recurring

—O—CO—NX— groups in the polymer chain (in each case the recurring groups are connected to carbon atoms of the polymer chain) with X being defined above; $A_q$ is the hard segment of the segmented polymer in which $q$ is a number equal to at least one; and $p$ is a large whole number.

The foregoing diagrammatic formula may be expanded to further illustrate the polymers of this invention. For example, a polymer having one type of polyamide hard segments may be represented by the formula

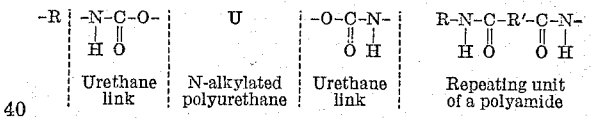

A polymer having one type of polyurethane hard segments may be represented by the formula

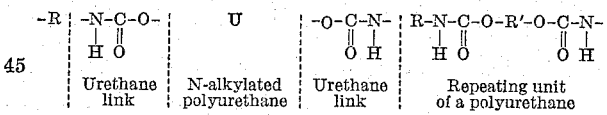

A polymer having one type of polyurea hard segments may be represented by the formula

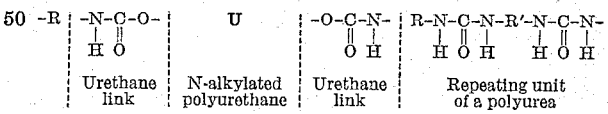

The organic radicals, R and R', will of course depend on the constituents which are used in preparing the hard segments. In addition, the optimum number of repeating units in the hard segment will vary, depending on the constituents used. This will be more fully explained later herein.

As used herein by "repeating units" it is meant a portion of the molecular chain of a linear polymer of such composition that the complete molecule might hypothetically be produced by bonding together a large number of such units similarly oriented as regards direction along the polymer chain. The polymers of this invention must contain at least one repeating unit of, for example, a polyamide prepared from a diamine and a diacid halide, or a dibasic acid and a diisocyanate; or a polyurethane prepared from a diamine and a bishaloformate, or a glycol and a diisocyanate; or a polyurea prepared from a diamine and a biscarbamyl halide, or a diamine and a diisocyanate. In each case the polymer-forming reactants must be selected to provide repeating units of a polymer which, in its fiber-forming molecular weight range, would have a melting point above 200° C.

By "non-bisureylene nitrogen-containing polymer" it is meant a polymer in which each nitrogen atom in the polymer chain is connected to two adjacent carbon atoms in the polymer chain.

One method for preparing such polymers is to react a selected, difunctional, hydroxyl-terminated N-alkylated polyurethane with an excess of phosgene to provide an N-alkylated polyurethane having terminal chloroformate groups. This polymer, together with the acid chloride of a selected dibasic acid, is then brought into reaction with a suitable organic diamine to provide a linear, segmented polymer within the scope of this invention. The elastic filaments from such polymers have outstandingly high fiber stick temperatures. Such temperatures are usually above 150° C.

For utility in fiber and filament applications, it is desirable to have elastic products which require no after-curing or after-treatment. In order to be suitable in textile applications for the replacement of rubber yarns, a synthetic elastic fiber should have the following properties as a minimum requirement:

Tensile recovery of 90% or more,
Stress decay of less than 20%, and
Fiber stick temperature of over 150° C.

"Tensile recovery" is the percentage return to the original length within one minute after the tension has been released from a fiber sample which has been elongated 50% at the rate of 100% per minute, and held at 50% elongation for one minute. "Stress decay" is the percent loss in stress in a yarn one minute after it has been elongated to 50% at the rate of 100% per minute. "Polymer melt temperature" is the minimum temperature at which a sample of the polymer leaves a wet, molten trail as it is stroked with moderate pressure across a smooth surface of a heated brass block. The "polymer melt temperature" has sometimes in the past been referred to as the "polymer stick temperature." The "fiber stick temperature" is the temperature at which the fibers will just stick to a heated brass block when held against the surface of the block for 5 seconds with a 200 g. weight. The polymers should also be spinnable into filaments of low deniers preferably below 50 and by careful selection of ingredients as low as 1.

Elastic fibers having the above-described minimum requirements are provided by the segmented polymers of this invention. These polymers are composed of "soft segments" and "hard segments" alternating in the polymer chain. The "soft segment" is an N-alkylated polyurethane having a molecular weight between about 600 and 5000 and melting below about 60° C. As indicated above, such a polymer may be provided with chloroformate end groups, and together with a diacid chloride may be reacted with a suitable diamine. The polyamide portion, comprising the diamine and acid chloride moieties, in the resulting polymer chain then constitutes the "hard segment." For elastic fiber applications, the suitable components making up the "hard segment" are those which form in an independent reaction a polyamide, a polyurea, or a polyurethane, with a melting point above 200° C. when its molecular weight is high enough to be in the fiber-forming range (above about 10,000). The preferred elastomeric products for fiber applications have melting points above about 150° C., and the "soft segments" of the preferred elastomers have molecular weights between about 1000 and 3500. To produce polymers which are elastomers at room temperature, it is required that the "soft segments" comprise about 60% to 90% by weight of the polymeric product.

The N-alkylated polyurethane from which the "soft segment" in the elastomer is derived may be a homopolymer or a copolymer. Copolymer formation is a useful method for modifying the properties of the polyurethane "soft segment" such as for reducing the melting point in those infrequent cases where it is too high to be useful. In addition to the melting point and molecular weight limitations, the polyurethane must be both difunctional and substantially fully substituted at the nitrogen atom in the urethane links occurring throughout the chain. The latter requirement is accomplished by using predominantly a secondary diamine or diamines in the preparation of the N-alkylated polyurethane. The N-alkylated polyurethane may be further substituted with halogen, aryl, and similar groups which do not interfere with the subsequent polymerization under the conditions used. In the practice of the invention, the proper reactants are chosen to produce a difunctional, low molecular weight N-alkylated polyurethane with the required low melting point. The alkyl substituent on the nitrogen of the N-alkylated polyurethane may bear substituents such as alkoxy, halogen, and the like which do not interfere with subsequent polymerization.

Difunctionality of a polymer denotes the capability for further polymer-forming reaction by virtue of two reactive groups in the polymer molecule. This characteristic of difunctionality is important when it is desired, as in this invention, to use already-formed polymers as intermediates in further polymerization. Hydroxyl or amine groups are the preferred functional groups for meeting the requirement of difunctionality in the N-alkylated polyurethanes, and it is preferred that both groups in a given polymer be the same, since reaction conditions are more complicated when they differ. Such N-alkylated polyurethanes with the required difunctionality may be prepared by reacting the bischloroformate of a glycol with a secondary diamine in an organic solvent free of water and in the presence of an excess of metalliferous base, such as calcium hydroxide. In any case, a difunctional, N-alkylated polyurethane is chosen such that it melts below 60° C. A polymer melting below 50° C. is preferred in the practice of this invention.

As indicated above, the "hard segments" found in the polymers of this invention may be repeating units of an amide, a urethane, or a urea polymer or copolymer. The type of "hard segment" produced depends on the reagents used to unite the N-alkylated polyurethane "soft segments" to form a high polymer chain. This linking together of the N-alkylated polyurethane segments is generally accomplished by the use of two or more complementary reagents, one of which is a nitrogen-containing compound. For example, an N-alkylated polyurethane with hydroxyl end groups may be converted to a macrobischloroformate by reaction with phosgene. The macrobischloroformate may then be reacted with a suitable diacid chloride and a diamine to produce a segmented polymer containing amide "hard segments." If a dicarbamyl chloride is used in place of the diacid chloride, a segmented polymer with urea "hard segments" will be produced. Again, if a bischloroformate of a suitable diol is used in place of the diacid chloride, a segmented polymer containing both urethane "hard segments" and "soft segments" will be produced.

An alternative route to the segmented polymers of this invention is to react a hydroxyl-terminated N-alkylated polyurethane with a molar excess of a suitable organic diisocyanate in order to form a macrodiisocyanate. Subsequent reaction of the macrodiisocyanate with a dicarboxylic acid, a diamine, or a diol will yield segmented polymers having, respectively, amide, urea, or urethane "hard segments."

The "hard segment" or high melting component of the segmented polymers of this invention is made up of units of a polymer, but as has been indicated previously, it is not essential that this be a homopolymer. The high melting component may be made of one type of unit or a majority of one type; in the latter event there may be present one or more of the other types of amide, urea, or urethane polymeric units. The units in the chain may be distributed in such a manner that no single type represents a majority. The essential feature is that the combination of units must have a melting point above 200° C. when the molecular weight is high enough to be in the fiber-forming range. Usually, high-melting polymers are obtained most readily when homopolymers are prepared and these are preferred. The preferred length of the "hard segment" depends upon the melting point of the high melting component and to some extent upon the molecular weight of the N-alkylated polyurethane. As the "hard segment" becomes shorter, it is preferable that it be a unit of a higher melting polymer, in order to obtain the desirable properties associated with the polymers of this invention. When the length of the "hard segment" is reduced to the minimum (i.e., the N-alkylated polyurethane segments are separated by only a single unit of the polymer), it is preferred that it be the repeating unit of a polymer with a melting point above 250° C. in the fiber-forming molecular weight range.

When the bischloroformate route described above is followed in the preparation of the polymers of this invention, the nitrogen-containing reagent used in this process will be a diamine. The diamines used to prepare these polymers may be any primary or secondary aliphatic, alicyclic, heterocyclic, or aromatic diamine as long as it is properly combined with a complementary reagent to form units of a polymer which melts above 200° C. when its molecular weight is in the fiber-forming range. As representative examples may be mentioned: ethylenediamine, propylenediamine, tetramethylenediamine, pentamethylenediamine, hexamethylenediamine, heptamethylenediamine, octamethylenediamine, p-xylylenediamine, 1,4-diaminocyclohexane, p-phenylenediamine, 1-methyl-2,4 - diaminobenzene, bis(p - aminocyclohexyl)methane, N,N' - dimethyltetramethylenediamine, N,N' - dimethylphenylenediamine, N,N' - dimethyl - p - xylylenediamine, N,N'-dimethyl-1,4-diaminocyclohexane, piperazine, and trans-2,5-dimethylpiperazine. Mixtures of diamines may be used as well. Piperazine and 2,5-dimethylpiperazine have been found particularly valuable for preparing many useful compositions falling within the scope of this invention. The dicarbamyl derivatives, e.g., those prepared from phosgene and any of the diamines listed, may be used to prepare suitable urea polymers. In addition, non-functional derivatives of the diamines listed may also be used as long as the substituents do not interfere with the polymerization. For example, the aliphatic diamines may have hydrocarbon side chains or be substituted with halogen or nitro groups, which are inert under the conditions used herein.

Any difunctional acid or its polyamide-forming derivatives may be used. This includes aliphatic, aromatic, mixed aliphatic-aromatic, and alicyclic dicarboxylic and disulfonic acids and both of these types of acids containing heterocyclic rings. Mixtures of and mixed carbonic and sulfonic acids or their polyamide-forming derivatives may be used. As specific examples of the useful acids may be mentioned succinic, adipic, suberic, sebacic, terephthalic, hexahydroterephthalic, isophthalic, phthalic, bibenzoic 1,5-naphthalene-dicarboxylic or sulfonic acids, piperazinediacetic acid, m-benzenedisulfonic acid, hexanedisulfonic acid, and 1,2-ethanedisulfonic acid. The acids may also be substituted with groups which do not interfere with the reaction. The only important limitation is that the acids must be combined with a properly selected diamine to form units of a polymer which has a polymer melt temperature above 200° C. in the fiber-forming molecular weight range. The acid halides have been found to be very useful amide-forming derivatives. Adipic, sebacic, terephthalic, hexahydroterephthalic, and 1,5-naphthalene-disulfonic and dicarboxylic acids and their derivatives have been found to be particularly useful.

The bischloroformates used with the diamine to form polyurethanes in the high melting segment can be prepared from any glycol or dihydroxy compound. This includes aliphatic, aromatic, mixed aliphatic-aromatic, cycloaliphatic, and difunctional hydroxy compounds containing heterocyclic rings. As specific examples may be mentioned the bischloroformates of ethylene glycol, propylene glycol, butylene glycol, p-xylylene glycol, cyclohexanediol, hydroquinone, resorcinol, catechol, 4-methylresorcinol, among others. As in the case with the diamines, mixtures of the bischloroformates may be used, or they may be substituted with groups which do not interfere with the reaction.

The bischloroformates of the hydroxyl-terminated N-alkylated polyurethanes or of other diols may, alternatively, be bromo-, iodo-, or fluoroformates, but usually the chloroformates are employed since they are easily prepared from the dihydroxy compound by the use of phosgene.

Amine-terminated N-alkylated polyurethanes are also useful in the preparation of the polymers of this invention. Such polymers may be reacted with a suitable diamine and the bischloroformate of a suitable dihydroxy compound to produce segmented polymers having urethane "hard segments" linked through urethane groups to N-alkylated polyurethane "soft segments." In such a reaction it is important that the complementary diamine have a reactivity approximately equal to that of the amine-terminated N-alkylated polyurethane. Thus, since the amine-terminated polymer usually has secondary amine end groups, a secondary diamine rather than a primary diamine should be used as a complementary reagent.

Suitable organic diisocyanates for use when the bischloroformate route is not employed, include aromatic, aliphatic, cycloaliphatic diisocyanates, and combinations of these types. The symmetrical aromatic diisocyanates constitute a preferred group in that they lead to higher melting segments than do unsymmetrical compounds. Such diisocyanates include p-phenylene diisocyanate, m-phenylene diisocyanate, 4,4'-biphenylene diisocyanate, p,p'-methylenediphenyl diisocyanate, and p,p'-isopropylidenediphenyl diisocyanate. The diisocyanate may contain other substituents, although those which are free from reactive groups other than two isocyanate groups are ordinarily preferred.

As will be apparent from the above description, a number of combinations can be made to produce the structures and compositions of this invention. Some of these are illustrated in the following table.

| Functional Groups Terminating N-alkylated Polyurethane | Preliminary Reactant | Other Reactants | "Hard Segment" |
|---|---|---|---|
| Hydroxyl | Phosgene | Diamine and Diacid Chloride. | Amide. |
| Do | do | Diamine and Biscarbamyl Chloride. | Urea. |
| Do | Diisocyanate | Dibasic Acid | Amide. |
| Do | Phosgene | Diamine and Bischloroformate. | Urethane. |
| Do | Diisocyanate | Diamine | Urea. |
| Do | do | Glycol | Urethane. |
| Amine | None | Diamine and Bischloroformate. | Do. |

As indicated above, the elastic properties attained by this invention result in part from the novel combination of a segment of a "hard" or high melting polymer with a "soft" or low melting polymeric segment. The polymers from which the former segments are derived all melt above 200° C., some melting points being exemplified as follows: poly(2,5-dimethylpiperazine terephthalamide), above 390° C.; polyurethane from piperazine and the bischloroformate of resorcinol, 352° C.; polyurethane from p,p'-methylenedianiline and the bischloroformate of diphenylolpropane, 245° C.; polyurea from p,p'-methylenediphenyl diisocyanate and 2,5-dimethylpiperazine, 314° C.

Elastic fibers prepared from the linear, segmented polymers of this invention display outstanding solubility, hydrolytic stability, and stability to ultraviolet light, as compared to closely related elastomers containing similar segments. Thus, the polymers of this invention containing urea "hard segments" have an unexpectedly higher solubility in dimethylformamide than analogous polymers containing bisureylene "hard segments" (i.e., prepared from hydrazine). The segmented polymers of this invention show improved hydrolytic stability over analogous polymers which differ in that an ester linkage units "hard" and "soft" segments. The polymers of this invention show an improved stability to ultraviolet light over analogous polymers which differ in that an amide link unites "hard" and "soft" segments. The segmented elastomers containing N-alkylated polyurethane "soft segments" show a decided advantage over analogous segmented elastomers prepared from polyester or polyether "soft segments," in that they display an outstanding stability both to ultraviolet light and to heat.

The outstanding stability which the polymers of this invention display both to ultraviolet light and to heat permits the taking of full advantage of the unique properties of a fine denier, elastic thread in uncovered yarn end uses. Of even greater importance is the use of these elastomers in staple blends with other fibers. In such blends, the elastomers of this invention may be used, for example, to upgrade fibers of lower quality, e.g., viscose, acetate, etc., or to prepare a more resilient yarn for carpet and rug applications.

In the following examples, parts given are by weight, except where otherwise noted. "Tenacity" is a measure of the tensile strength of fibers expressed in grams per denier (g.p.d.). "Elongation" is the percent elongation of the fiber at the breaking point. "Initial modulus" is determined by measuring the initial slope of the stress-strain curve. "$M_{50}$" is the slope of the stress-strain curve at 50% elongation.

Example I

N,N'-diethylhexamethylenediamine (27 grams) and 59 grams of calcium hydroxide are dispersed in 500 ml. of dry benzene. To this dispersion is added a solution of 40 grams of the bischloroformate of 2,2-dimethyl-1,3-propanediol in 500 ml. of dry benzene. The solution is added slowly and the reaction mixture stirred overnight at room temperature. The reaction mixture is filtered, and the benzene removed from the filtrate by distillation. To the residue is added 500 ml. of acetone, 120 ml. of water, and 7 grams of sodium carbonate, and the mixture is refluxed overnight. Acetone and water are distilled off, 500 ml. of benzene is added, and the reaction mixture is filtered to remove insoluble calcium hydroxide/calcium chloride. The filtrate is concentrated, and the residual viscous liquid is heated at 100° C. at less than 1 mm. pressure for 16 hours. The hydroxyl-terminated polyurethane, obtained in 88% yield, is a white, viscous liquid containing by analysis 660 hydroxyl groups per million grams and 15 amino groups per million grams, corresponding to a molecular weight of 2950.

The above-described N-alkylated polyurethane (30 grams) is reacted with stirring with 5 grams of p,p'-methylenediphenyl diisocyanate at 85° C. for one hour. An additional 8.33 grams of the diisocyanate is added, the solution is cooled to 0° C., and there is slowly added a solution of 5.03 grams of 2,5-dimethylpiperazine in 15 ml. of N,N-dimethylformamide. There is obtained a solution of a linear, segmented elastomer containing urea "hard segments" linked through urethane groups to N-alkylated polyurethane "soft segments." After about 15 minutes' stirring, the solution is dry-spun in the usual manner to yield elastic fibers with the following properties: tenacity 0.5 g.p.d.; elongation 680%; initial modulus 0.2 g.p.d.; tensile recovery 95%; stress decay 8%.

Example II

A mixture of 19 grams of N,N'-diethylhexamethylenediamine, 22.4 grams of the bischloroformate of ethylene glycol, and 59 grams of calcium hydroxide are reacted in 1000 ml. of benzene in the manner described in Example I. There is obtained a 95% yield of white, viscous liquid, containing by analysis 605 hydroxyl groups per million grams and 10 amino groups per million grams, corresponding to a molecular weight of approximately 3300. This hydroxyl-terminated polyurethane is then reacted with excess phosgene overnight to yield an N-alkylated polyurethane having chloroformate end groups.

A solution of 16.5 grams of the above-described macrobischloroformate and 3.6 grams of the bischloroformate of resorcinol in 185 ml. of methylene chloride is placed in a blender. To the vigorously stirred solution is slowly added a solution of 4.9 grams of piperazine and 9.0 grams of sodium carbonate in 70 ml. of water. The mixture is stirred for several minutes and is poured into excess water. Methylene chloride is distilled off. After filtration, the residue is washed with water and with acetone, and dried, yielding a segmented elastomer containing urethane "hard segments" linked by urethane groups to urethane "soft segments." This polymer is an entirely N-alkylated polyurethane. The polymer has an inherent viscosity in m-cresol of 1.3, a polymer melt temperature of 255° C. and contains approximately 80% of N-alkylated polyurethane soft segments.

Films are cast from a chloroform/formic acid (25/75) solution of the segmented polymer. The films are elastic and have a tenacity of 0.30 g.p.d. After 125 hours' exposure either to ultraviolet light in a Fade-Ometer or to 100° C. air in an oven, the films still retain over half of their original tenacity.

Example III

The difunctional, hydroxyl-terminated N-alkylated polyurethane described in Example I (30 grams) is reacted with stirring with 5 grams of p,p'-methylenediphenyl diisocyanate at 85° C. for one hour. The isocyanate-terminated polymer is taken up in 100 ml. of dimethylformamide containing an additional 10 grams of p,p'-methylenediphenyl diisocyanate. A solution of 11.3 grams of diphenylolpropane in 15 ml. of dimethylformamide is added, and the mixture is stirred for 2 hours at 125° C. There is obtained a solution of a segmented polyurethane containing approximately 60% of N-alkylated polyurethane "soft segments." Elastic films are obtained from this solution by casting.

Example IV

To a mixture containing 31 grams of N,N'-dimethylhexamethylenediamine and 59 grams of calcium hydroxide in 500 ml. of dry benzene is added 45 grams of the bischloroformate of 2,2-dimethyl-1,3-propanediol in 500 ml. of dry benzene with stirring. The mixture is stirred for 8–16 hours and is filtered. The filtrate is concentrated and the residual viscous liquid heated at 100° C. at less than 1 mm. pressure for 16 hours. The N-alkylated polyurethane product, terminated with amine groups, is obtained in 57% yield. It is a white, viscous liquid which contains by analysis 635 amino groups per million grams and no chlorine. These data indicate a molecular weight of approximately 3300.

The above-described N-alkylated polyurethane is subjected to interfacial polymerization in the following manner: The N-alkylated polyurethane (16.5 grams) in 185 ml. of chloroform is reacted in a blender with 3.6 grams of the bischloroformate of resorcinol for a period of 20 seconds. After this time, a solution of 1.0 gram of piperazine and 4.0 grams of sodium carbonate in 70 ml. of water is added with vigorous stirring. After stirring for approximately five additional minutes, there is obtained an 80% yield of a segmented, fully N-alkylated polyurethane containing approximately 80% of "soft segments." The elastic polymer so obtained has an inherent viscosity of 1.7 as determined in m-cresol.

*Example V*

A mixture of 34 grams of N,N'-diisobutylhexamethylenediamine, 38 grams of the bischloroformate of 2,2-dimethyl-1,3-propanediol, and 59 grams of calcium hydroxide is reacted in 1000 ml. of benzene in the manner described in Example I. There is obtained a 54% yield of hydroxyl-terminated N-alkylated polyurethane in the form of a white, viscous liquid. The product analyzes for 640 hydroxyl groups and 8 amino groups per million grams, corresponding to a molecular weight of approximately 3100.

The above-described hydroxyl-terminated N-alkylated polyurethane is reacted overnight with excess phosgene to yield an N-alkylated polyurethane with chloroformate end groups. This macrobischloroformate (15.5 grams) in 185 ml. of methylene chloride is reacted with 3.3 grams of 2,5-dimethylpiperazine in a blender for a period of 30 seconds. After this time, a mixture of 4.6 grams of terephthaloyl chloride in 70 ml. of water containing 6.0 grams of sodium carbonate is added with vigorous stirring. After several minutes' additional stirring, there is obtained a segmented elastomer composed of amide "hard segments" linked through urethane groups to N-alkylated polyurethane "soft segments." The "soft segments" make up approximately 75% of the segmented polymer. The product has an inherent viscosity of 2.1 as determined in m-cresol, and has a polymer melt temperature of 300° C. Elastic films are obtained by casting solutions of the segmented polymer in trichloroethane/formic acid (60/40). These films have the following properties: tenacity 0.20 g.p.d.; elongation 625%; initial modulus 0.10 g.p.d.; $M_{50}$ 0.08 g.p.d.; stress decay 18%; tensile recovery 93%. The films retain over one-half of their original tenacity when exposed to 100° C. air in an oven for 125 hours.

One of the outstanding features of the present invention is the adaptability of the polymers herein disclosed to be dry spun into filaments of deniers as low as 1 or 2. By wet spinning, filaments of deniers of 20 to 200 are readily spun.

In addition to urea, urethane, amide, and diisocyanate components which have been disclosed, the thio derivatives of these components may be incorporated in the polymers of this invention.

It will be apparent that many widely different embodiments of this invention may be made without departing from the spirit and scope thereof, and therefore it is not intended to be limited except as indicated in the appended claims.

I claim:

1. A substantially linear segmented polymer consisting essentially of a plurality of intralinear segments of two classes connected by urethane linkages, the segments of the first class being the polymeric residues remaining after removal of the functional end groups of a difunctional N-alkylated urethane polymer having a melting point below about 60° C. and a molecular weight above about 600, the segments of the second class containing at least one repeating unit of a fiber-forming synthetic linear polymer having a melting point above about 200° C. in the fiber-forming molecular weight range, said fiber-forming polymer being selected from the group consisting of polyamide, polyurea, and polyurethane, said segmented polymer being represented by the formula

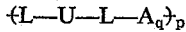

wherein q is a number not less than 1, p is a large whole number, U represents a segment of said first class, $A_q$ represents a segment of said second class, and L represents a urethane linkage having the formula

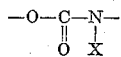

wherein X is selected from the group consisting of hydrogen and alkyl and alkylene radicals wherein said alkylene radical is a bridging radical between the nitrogens of a heterocyclic diamino radical, with the proviso that any intralinear nitrogen atoms in said segment of the second class be connected to each of two intralinear atoms selected from the group consisting of (1) carbon and sulfur and (2) carbon and carbon.

2. The segmented polymer of claim 1 wherein said N-alkylated urethane polymer is substantially fully substituted at the nitrogen in the urethane linkages throughout the polymer chain.

3. A substantially linear segmented polymer consisting of first and second segments alternating in the polymer chain, said segments being connected to each other through a urethane linkage having the formula

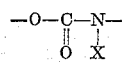

wherein X is selected from the group consisting of hydrogen and alkyl and alkylene radicals wherein said alkylene radical is a bridging radical between the nitrogens of a heterocyclic diamino radical, said first segment being the residue remaining after removal of the terminal hydroxyl groups of a difunctional hydroxyl terminated N-alkylated urethane polymer having a molecular weight above 600 and a melting point below 60° C., said second segment being at least one repeating unit of a synthetic linear nitrogen-containing polymer in which each nitrogen atom is connected to two intralinear carbon atoms adjacent thereto, said nitrogen-containing polymer being selected from the group consisting of amide, urethane and urea polymers having a melting point above 200° C. in the fiber-forming molecular weight range.

4. The segmented polymer of claim 2 in which the molecular weight of the N-alkylated urethane polymer is between about 800 and 5000.

5. The segmented polymer of claim 1 in which the said N-alkylated urethane polymer has a melting point below about 50° C.

6. The segmented polymer of claim 1 in which the said N-alkylated urethane polymer has a molecular weight between 1000 and 3500.

7. The segmented polymer of claim 1 in which the fiber-forming synthetic linear polymer has a melting point above 250° C.

8. The segmented polymer of claim 1 in which the segments of said second class contain at least two heterocyclic nitrogen atoms of a piperazine in the polymer chain.

9. The segmented polymer of claim 1 wherein from 60% to 90% of the weight of said segmented polymer is provided by segments of said first class.

10. A filament made from the segmented polymer of claim 9 having a tensile recovery of at least 90%, a stress decay of less than 20% and a fiber stick temperature of over 150° C.

11. The filament of claim 10 having a denier below 50.

12. A film made from the polymer of claim 1.

13. A substantially linear segmented polymer consisting essentially of a plurality of repeating intralinear structural units represented by the formula

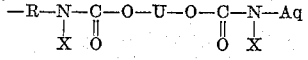

wherein A represents a repeating unit of a non-bisureylene nitrogen-containing fiber-forming synthetic linear polymer having a melting point above about 200° C. in the fiber-forming molecular weight range selected from the group consisting of a polyamide repeating unit of the formula

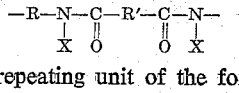

a polyurethane repeating unit of the formula

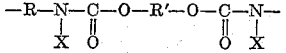

and a polyurea repeating unit of the formula $$-R-\underset{\underset{X}{|}}{N}-\underset{\underset{O}{||}}{C}-\underset{\underset{X}{|}}{N}-R'-\underset{\underset{X}{|}}{N}-\underset{\underset{O}{||}}{C}-\underset{\underset{X}{|}}{N}-$$

U represents the polymeric residue remaining after removal of the functional end groups of a difunctional N-alkylated urethane polymer having a molecular weight about 600 and a melting point below 60° C., R and R' are bivalent organic radicals, X is selected from the group consisting of hydrogen and alkyl and alkylene radicals with the proviso that when X is an alkylene radical said alkylene radical is a bridging organic radical between intralinear nitrogens of a heterocyclic diamino radical, and $q$ is a number not less than 1.

14. A segmented polymer of claim 13 wherein from about 60% to about 90% of the total weight is provided by said N-alkylated urethane polymer residues.

References Cited in the file of this patent

UNITED STATES PATENTS

| | | |
|---|---|---|
| 2,813,775 | Stuber | Nov. 19, 1957 |
| 2,929,801 | Koller | Mar. 22, 1960 |
| 2,929,803 | Frazer et al. | Mar. 27, 1960 |

FOREIGN PATENTS

| | | |
|---|---|---|
| 892,361 | France | Jan. 7, 1944 |
| 895,395 | France | Apr. 3, 1944 |

UNITED STATES PATENT OFFICE
CERTIFICATE OF CORRECTION

Patent No. 3,044,990 July 17, 1962

Walter Steuber

It is hereby certified that error appears in the above numbered patent requiring correction and that the said Letters Patent should read as corrected below.

Column 11, line 8, for "about" read -- above --.

Signed and sealed this 30th day of October 1962.

(SEAL)
Attest:

ERNEST W. SWIDER
Attesting Officer

DAVID L. LADD
Commissioner of Patents